3,012,287
METHOD OF MOLDING COMPOSITE POLYMERIZED ARTICLES
John L. Tucker, Drexel Hill, Pa., assignor to H. D. Justi & Son, Inc., a corporation of Pennsylvania
Filed Oct. 14, 1959, Ser. No. 846,236
9 Claims. (Cl. 18—55.1)

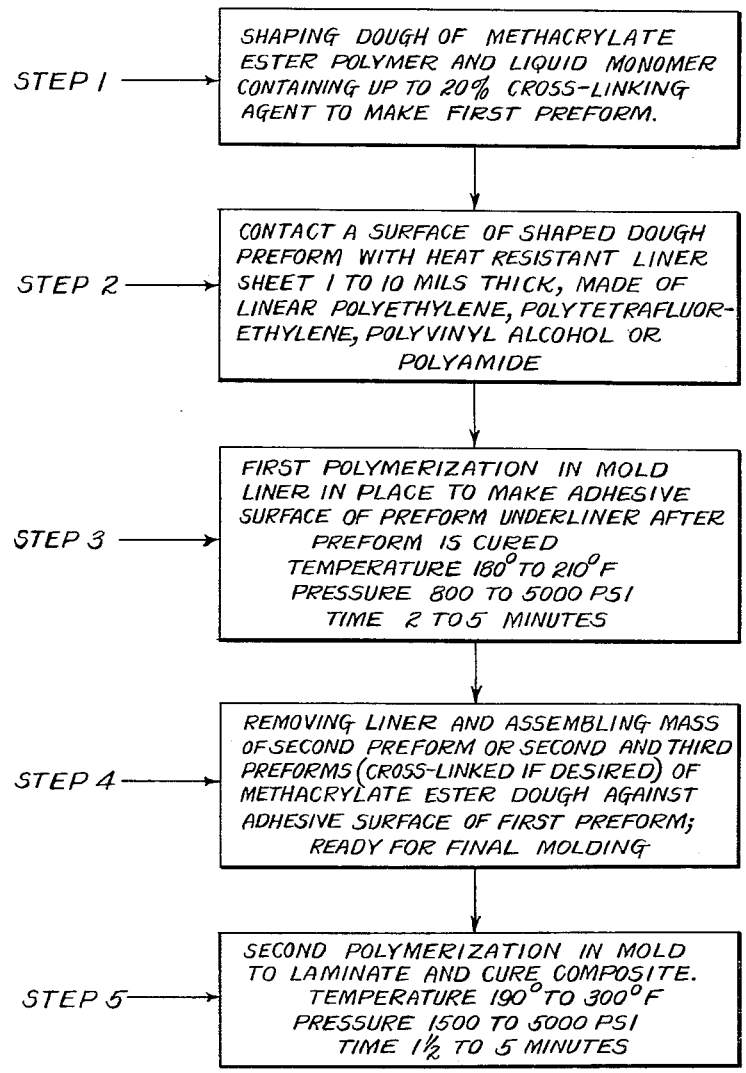

This invention relates to a method of manufacturing composite molded polymerized articles of polymerized acrylic resin, the articles being useful in the form of artificial teeth and dentures, plastic inlays, plastic jewelry, etc., and is based upon the discovery of a novel bonding procedure which takes place between contacting surfaces of a preformed polymerized methacrylate ester element and an unpolymerized methacrylate element joined by molding, if during the preforming and curing of said polymerized methacrylate ester element a specific type of removable sheet liner material is interposed between the bonding surface of said element and the metal surface of the mold, which is used for preforming said rigid element whereby the interposition of said liner material develops a chemically reactive surface for bonding to the unpolymerized methacrylate ester element.

The removable sheet liner material which is used during curing of the polymerized methacrylate ester element creates a chemically reactive bonding surface of the preformed polymerized methacrylate ester element which is believed to be due to a condition of incomplete polymerization which is confined in a very thin layer at the surface of the polymerized preform between the liner and the interior body portion of the preform. Improved chemical bonding takes place between the unpolymerized methacrylate ester element and the polymerized methacrylate ester when there is present in the polymerized element, when it is formed and cured, a bifunctional polymerizable cross-linking monomer such as ethylene glycol dimethacrylate or allyl methacrylate.

The unpolymerized methacrylate ester element which is provided for composite bonding and molding operations in accordance with the invention is prepared by mixing a slurry of finely divided polymerized methacrylate ester in a methacrylate ester monomer to which is added a free radical polymerization catalyst such as benzoyl peroxide, lauroyl peroxide, methyl ethyl ketone peroxide, cumene hydro peroxide, etc., these usable with promoters such as cobalt naphthenate, tertiary amines, etc. With benzoyl or lauroyl peroxide there may be used tertiary amine promoters such as dimethyl para toluidine for example or benzene sulfinic acid or toluene sulfinic acid.

It is not unlikely that incompletely polymerized methacrylate ester and cross-linking agent are present at the liner treated surface and which are confined to a thin layer at the surface undergo further polymerization during the subsequent molding and joining operation to bond to the unpolymerized methacrylate ester element in order to form a composite molded structure.

It is well known that the addition of polyfunctional monomers to polymerizable methacrylate ester compositions provide harder, more heat resistant and more scratch resistant polymerized methacrylate ester products with improved impact resistance. See pages 208–210, Schildknecht "Vinyl and Related Polymers," 1952, John Wiley and Sons, Inc.

If this known hardening procedure of adding cross-linking agent for fabrication of the polymerized preform is followed and if the interposition of the special sheet liner for creating a potentially adhesive surface of the preform during molding is omitted, the resulting polymerized preform exhibits no chemical bonding to an unpolymerized methacrylate ester element. Unless the surface of the cross-linked polymerized preform is roughened mechanical bonding is also very poor.

Accordingly, the interposition of the liner sheet to create a potentially adhesive surface of the latent adhesive polymerized preform is an essential feature of the invention in order to achieve superior bonding to the unpolymerized methacrylate ester element in accordance with the invention.

In accordance with the invention there is preferably added to the latent adhesive preform composition about 2 to about 20% of a bifunctional methacrylate monomer as cross-linking agent such as allyl methacrylate, methallyl methacrylate, ethylene dimethacrylate, polyethylene glycol dimethacrylates including diethylene glycol dimethacrylate, triethylene glycol dimethacrylate, tetraethylene glycol dimethacrylate and higher polyglycol dimethacrylates.

During the subsequent joining of the latent adhesive polymerized preform to the unpolymerized preform by molding, the bifunctional monomer apparently diffuses from the surface of the latent adhesive preform into the body portion of the unpolymerized preform. It has been observed that the composite products made by molding and incorporating cross-linking agents in the latent adhesive preform bonded to an unpolymerized preform display outstanding adhesion characteristics at the interface between the latent preform and the unpolymerized preform after molding.

The production and use of peroxide catalyzed methacrylate monomer-polymer slurries containing from 25–40% liquid monomer and 62–75% of very finely divided polymer powder for molding small dental parts and composite teeth from preformed parts is well known.

The preforms used for the production of composite teeth have been assembled and molded at temperatures of about 175° F. to 300° F. and at pressures of 50 p.s.i. up to 200 p.s.i.

However, in the practice of the present invention it is preferred to form the latent adhesive preform containing cross-linking agent in a first stage curing under higher pressures, e.g., from 100 p.s.i. to 2000 p.s.i., preferably from 800–2000 p.s.i. to form an initially shaped mass, said latent adhesive preform being cured in the mold with the liner interposed between the latent adhesive surface and the mold surface at a polymerizing temperature of about 180° F.–210° F. and under curing pressure of about 2000–3000 p.s.i. for about 2–10 minutes. The latent adhesive preform so treated with the liner is thus put into condition for joining to an unpolymerized preform after the first stage curing.

The unpolymerized preform is formed in similar manner but the step of applying the liner to create the latent adhesive surface of the first preform is omitted. The initial mass is formed at room temperature under pressure of 800–2000 p.s.i. but no curing takes place.

After the latent adhesive preform is subjected to first stage curing with the liner interposed between the surface which is to be rendered latently adhesive and the surface of the mold, the latent adhesive preform is juxtaposed with an unpolymerized preform and the second stage curing is carried out at a temperature of 250–350° F. and a pressure of 1500 p.s.i. to 5000 p.s.i. for about 2 to about 10 minutes to thereby produce the composite tooth structure.

It is an essential requirement in accordance with the invention that the liner sheet which is interposed between the methacrylate ester monomer-polymer slurry or dough and the metal wall of the mold cavity in order to develop the latent adhesive surface characteristics of the latent adhesive rigid preform be non-adherent to the monomer-polymer composition during the first curing operation at elevated temperatures and pressures, e.g., from 180–210° F. and 800–2000 p.s.i. for from 2 to 10 minutes.

It has been found that the selection of any heat-resistant materials from which the liner is made, is not, of itself, sufficient to create the latent adhesive surface characteristics at the liner treated surface of the latent adhesive preform. Only certain heat-resistant liner materials are successful. Heat resistant gum rubber and heat-resistant polyethylene terephthalate (Mylar) films, in thickness up to 10 mils were found to be non-adherent to methyl methacrylate monomer-polymer slurries at room temperature but became adherent during curing the above-stated conditions in the mold so that the latent adhesive surface for chemical bonding was not obtained. Similarly heat-resistant polyvinylidene chloride liners (Saran) were unsatisfactory due to adhering to the cured preform thereby preventing the achievement of a latent adhesive on the rigid preform surface for chemical bonding. Dry heat-resistant cellophane was found to be unsatisfactory, due to adhesion to the surface of the rigid preform after first stage curing. The dry cellophane was also found to be embrittled. Highly plasticized cellophane (excess of glycol or glycerol plasticizer) which was wet with the plasticizer did not adhere to the preform during curing but also did not develop the latent adhesive surface in the latent adhesive preform which is the essential purpose of the invention.

Accordingly, it was surprising to find that only four materials for the liner were successful in achieving the necessary latent adhesive characteristic of the surface of the preform for chemical bonding in the subsequent compositing laminating operation by molding. These materials successfully employed are the following:

(1) High temperature resistant linear polyethylene having a molecular weight above 50,000 or higher, density of 0.93–0.95, heat resistance up to 250° F., melting point of about 130° C. or higher exemplified by Hi-fax sheet (E. I. du Pont and Co.), Marlex sheet (Phillips Petroleum Company), and Grex sheet (W. R. Grace & Co.).

(2) Tetra fluoro-ethylene polymer.

(3) Temperature resistant polyvinyl alcohol.

(4) 6,6 nylon polymer of melting point about 265° C. and density in crystalline form of 1.14 grams per cubic centimeter, this nylon being the condensation product of hexamethylene diamine and adipic acid.

These heat-resistant materials in the form of sheets from about 1–10 mils in thickness are effective as liner sheets for developing a latent adhesive chemical bonding surface for the acrylic rigid preform which has been subjected to the first curing step in the mold at a temperature of about 180–210° F. and pressure of 800–2000 p.s.i. for from 2–10 minutes.

Accordingly, an object of the invention is to prepare a latent adhesive surface on a rigid acrylic resin part formed in a metal mold by polymerizing an acrylic monomer-polymer slurry or dough by interposing a removable heat-resistant liner sheet made of a material as specified in the preceding paragraph, between the surface of the acrylic part being molded and the metal wall of the mold whereby the surface of the acrylic part is modified even though the polymerization in the mold has resulted in the production of a completely rigid acrylic resin formed product, this product being thereby rendered suitable for chemical bonding to a rigid polymerized acrylic resin product which is molded entirely in contact with the metal walls of the mold, the chemical bonding taking place in a mold by juxtaposing both products under molding heat and pressure.

A further object of the invention is to prepare a highly effective latent adhesive surface on a rigid acrylic resin part formed in a metal mold by interposing a heat-resistant liner sheet as specified in the preceding paragraph in which a cross-linking agent for the acrylic monomer-polymer dough composition is incorporated in said dough composition in an amount of from about 2 to about 20% by weight of said dough composition whereby bonding is subsequently effected, in situ, to an unpolymerized acrylic resin part during a subsequent molding and laminating operation carried out at elevated temperatures and pressures.

Other and further objects will become apparent from the following detailed description and examples of several typical forms of the invention, it being understood that this description is by way of illustration and that modifications may be carried out as will appear to those skilled in the art which will fall within the spirit and the scope of the invention.

In carrying out the invention in an illustrative form, a first mixture of a selected monomer, methyl methacrylate plus a small percentage of ethylene glycol dimethacrylate, and a selected polymer, polymethyl methacrylate, is made in a mass of generally dough-like deformable viscous consistency, which, when polymerized, has a predetermined visual aspect, illustratively, in the case of a tooth, the gingival or lingual part of a composite tooth.

A brief comparison which illustrates the difference in bonding achieved in commercial procedures and the procedure of the invention is set forth below.

A first cross-linked and pigmented polymerized part was prepared by molding an intimate mixture of a methyl methacrylate monomer polymer dough containing 2.4 parts of finely divided solid methyl methacrylate polymer (6% through 60 on 100 mesh, 40% through 100 mesh on 150 mesh, about 34% through 150 mesh on 250 mesh, about 20% through 250 mesh, Tyler standard sieve), 1 part of methyl methacrylate monomer, 0.02 part of benzoyl peroxide and 0.30 part of ethylene glycol dimethacrylate as cross-linking agent under a pressure of 2000–2500 p.s.i. at a temperature of 205° F. for about 3–5 minutes. A standard amount (5%) of white titanium dioxide pigment is added to the dough. The form of the first mold part is that used for making a composite incisor tooth. The first mold part had a highly glossy surface exterior.

To the first molded tooth part there is applied an overlay of the same dough composition as defined in the previous paragraph but which is tinted with iron oxide to provide a different visual appearance for the overlay. The overlay is bonded by molding to the first mold part at a temperature of 250° F. and pressure of 2000 p.s.i. for a period of three minutes.

This composite tooth was picked apart by prying with a sharp-pointed pick. After carefully picking off the polymerized dough overlay, the surfaces of the first rigid body part which was brought by molding into contact with the second part formed by the dough overlay was completely exposed. This first part surface is slightly less glossy than before juxtaposition with the dough overlay. The polymerized dough overlay was successfully pried off as an intact piece. Accordingly, it was concluded that the bonding achieved was weak and mainly mechanical bonding.

The incisal of the above mentioned tooth was ground from the lingual (back) surface on a grinding wheel. The hardened labial portion chipped away on the wheel exposing the rigid first part member, this also demonstrating the weakness of mechanical bonding.

In contrast a tooth made in accordance with the procedure of Example I of the invention (except that the same composition as above was used) and using the liner sheet material to develop a latent adhesive surface in the first mold port, e.g., the latent adhesive preform resulted in a composite tooth which could not be pried apart with the pick to expose the surface of the first rigid mold part and which when ground at the incisal in the same manner as the first tooth tested permitted an even wearing away of both front and back parts without any fracture of either part or any separation at the bond. Fracture by prying with the sharp instrument took place either below the contacting surface of front and back portions or above the contacting surface. In no instance was a substantital bond interfacial area exposed. It appeared that a depth of bond at the interface in both directions, front and back, was achieved, thus indicating that the bond is entirely different in character than mechanical bonding achieved in the absence of use of the present liner material.

In another embodiment of the invention the first latent adhesive preform which contains as a component of its dough composition a cross-linking agent such as ethylene glycol dimethacrylate may be faced with a thin preformed layer of methyl methacrylate dough composition, e.g., a dough mixture of polymethyl methacrylate powder and methyl methacrylate liquid before joining to the second unpolymerized mass in forming the composite tooth under heat and pressure. The interposition of a thin joining layer of the aforesaid dough composition between the preform and the second unpolymerized dough mass appears to enhance the tenacity of the bond and it appears that cross-linking agent can diffuse through this thin interposed layer. It is significant that enhanced bonding is achieved in such a short curing cycle as shown in the present examples whereas prior procedures require much longer curing time in the mold.

In comparison with teeth hitherto made commercially from unpolymerized preforms which are bonded in situ by molding in accordance with the process disclosed in Slack Patent No. 2,678,470, the composite teeth made in accordance with the presentt invention can be made in greater dimensional accuracy for each of the parts brought together and bonded in the mold. The dough preform parts used in the Slack process tend to run or distort slightly during in situ molding. Precise duplication of these differently shaded parts is not achieved due to this distortion. With the insistence upon more exacting specifications for precise duplication of shading as it appears in natural teeth, this being different at the incisal tip and the lingual, mesial and distal surfaces of the teeth, there has been a need to improve the accuracy of manufacturing to improve the quality and appearance of the teeth made by the Slack invention. This need is satisfied by the present invention.

A further disadvantage of the teeth made by the process of the said Slack patent is the tendency to porosity which occurs by reason of minute displacement of the tapered dough sections during in situ molding. This porosity provides a site for water absorption. The lower porosity achieved in accordance with the invention by the forming of a rigid latent adhesive preform results in teeth not subject to this water sorption. Also the lower porosity in teeth made by the invention provides composite acrylic teeth of greater density which have better wearing qualities.

The invention is further illustrated in the drawing herewith, in which the method steps are set forth in the form of a flow sheet and in the examples which follow:

EXAMPLE I

Method of molding composite polymerized teeth

The following example describes the manufacture of plastic teeth utilizing a three piece mold as disclosed in Patent No. 2,409,783 to Moskey. One part of this mold is used to preform and cure a particular shaped portion of the tooth and additional plastic material is added in the final molding step to obtain a controlled blending of two different shades.

The materials used are dough mixtures of a methacrylate ester monomer and a suitable cross-linking monomer mixed with a finely divided methyl methacrylate polymer to form a handleable dough capable of being molded by standard compression molding technique.

MIXING OF DOUGH

The above mentioned methyl methacrylate polymer is mixed with a polymerizable liquid methyl methacrylate monomer in a ratio of from 1.8 to 2.6 parts by weight of polymer to 1 part by weight of the monomer and as cross-linking agent, 5% by weight of the composition of ethylene glycol dimethacrylate. The mixture is allowed to stand for from 5 to 35 minutes after which period of time a handleable dough is formed.

DOUGH PERFORMS

*Lingual preform.*—The above formed dough is pressed between two polyethylene sheets in a mold to form a doughnut shaped preform under pressure of about 800 p.s.i.–1000 p.s.i. The preform may be molded at from 100 p.s.i. to 2000 p.s.i. if desired.

*Labial preform.*—A dough of the same composition as described above, is pigmented to a different shade and is placed between two polyethylene sheets and pressed in a mold under a pressure of 800 p.s.i.–1000 p.s.i. to form a thin, flat disc having a rectangular cross section. The preform may be molded at 100–2000 p.s.i. if desired.

*Dough preform drying.*—To assist in the removal of excess monomer a drying operation may be performed as follows:

The doughnut shaped lingual preform is laid out and one of the polyethylene sheets (see description of first stage curing) is removed and the dough allowed to air dry for a period of from 1½ to 10 minutes. This step aids in the elimination of porosity from the final molded article.

The dried side of the doughnut shaped dough preform is placed toward the labial or buccal side of the mold and the undried side is placed toward the lingual or back side of the mold having removed the polyethylene sheet from the undried side and having placed it on the dried side of the doughnut shaped preform. The component or forming top of the mold is put into place and closed under from 500 to 2500 p.s.i.; the preferred pressure being 1500–1800 p.s.i.

The polyethylene sheet has been left in place on the labial or buccal surface to act as a temporary liner so the tooth shaped dough preform will remain in the lingual or back half of the mold when the mold is opened. In both cases, the mold is opened and the polyethylene sheet removed from the labial or buccal side.

The back or lingual portion of the mold containing the tooth shaped dough preform is placed in a drying oven at a temperature of from 25 to 75° C., the preferred temperature range being 60–65° C. These tooth shaped dough preforms are allowed to remain in the drying oven from 1 to 10 minutes. This drying procedure insures the removal of the volatile methacrylate ester monomer from the surface and decreases the amount of porosity in the final molded piece.

FIRST STAGE CURING

The back or lingual portion of the mold containing the tooth shaped dough preform is removed from the drying oven. A polyethylene liner sheet of the temperature resistant high density type, i.e., Hi-fax, Marlex-50, or Grex, is placed in contact with the exposed, dried, labial preformed dough shape and the component or forming labial portion of the mold is placed over this polyethylene liner sheet. The mold is closed. The tooth shaped preform faced with the temperature resistant polyethylene sheet in the closed mold is then polymerized at a temperature of from 180 to 210° F., a pressure of 1500 p.s.i. to 5000 p.s.i. for from 1½ to 5 minutes, the preferred temperature range is 190–205° F. at a pressure of 2000 p.s.i. to 2500 p.s.i. for about 3–5 minutes.

Without the use of the temperature resistant polyethylene liner sheet during the first stage curing, a satisfactory bonding of the labial portion to the lingual portion as described later in this example was not accomplished.

SECOND STAGE MOLDING

The mold now contains the polymerized preform. The mold is removed from the open press without cooling. The labial or buccal forming top is removed. The temperature resistant polyethylene liner sheet is also removed. Both of the polyethylene sheets used to form the labial preform disc are removed. The labial dough preform is not subjected to any drying operation and is put into place against the surface of the previously polymerized lingual portion. This portion was in contact with the temperature resistant polyethylene liner sheet during the first stage curing operation. The mold top is then put into place with the labial dough preform directly in contact with the metal mold surface.

The mold is closed and placed under a pressure of from 50 p.s.i. to 1000 p.s.i. and then placed in a press operating at a temperature of from 250° to 350° F. and a pressure of from 1500 p.s.i. to 5000 p.s.i. for from 1½ to 5 minutes.

COOLING

Without opening the mold it is transferred to a press operating at room temperature and the pressure is dropped to about 600–1000 p.s.i. After a period of time sufficient to cool the mold to less than 100° F., e.g., about 2–3 minutes, the mold is opened. In this example it is seen that the temperature in the second stage of curing is higher than in the first stage of curing.

EXAMPLE II

In this example, the proceedings as outlined in Example I are followed except that the labial or incisal portion is cured first with a liner sheet in place, then a doughnut shaped dough comprising the lingual or body portion is put into place and the two (rigid labial, dough lingual) are polymerized compositely.

EXAMPLE III

The following example describes manufacture of plastic teeth utilizing a three piece mold as in Example I.

MIXING OF DOUGH

1. *Lingual or body dough.*—Polymethyl methacrylate is mixed with methyl methacrylate monomer containing ethylene glycol dimethacrylate in a ratio of 1.8 to 2.6 parts by weight of polymer to one part by weight of monomer and allowed to stand for from 5 to 35 minutes after which period of time a handleable dough is formed.

2. *Intermediate dough.*—Polymethyl methacrylate is mixed with methyl methacrylate monomer in a ratio of 1.8 to 2.6 parts by weight of polymer to one part by weight of the monomer and allowed to stand for from 5 to 35 minutes after which period of time a handleable dough is formed.

3. *Labial or tip dough.*—Polymethyl methacrylate is mixed with methyl methacrylate monomer containing ethylene glycol dimethacrylate in a ratio of 1.8 to 2.6 parts by weight of polymer to 1 part by weight of the monomer and allowed to stand for from 5 to 35 minutes after which period of time a handleable dough is formed.

DOUGH PREFORMS

1. *Lingual or body preform.*—The above formed dough is pressed between two polyethylene sheets in a mold under 800 p.s.i. to form a doughnut shaped preform. The preform may be molded at from 100 p.s.i. to 2000 p.s.i. if desired.

2. *Intermediate preform.*—The above formed dough being pigmented to the same shade as the body dough is placed between two polyethylene sheets and placed in a mold under 800 p.s.i. to form a flat disc having a rectangular cross section of uniform thickness 0.010 inch thick. The preform may be molded at from 100 p.s.i. to 2000 p.s.i. if desired.

3. *Labial preform.*—The above formed dough being pigmented to a different shade is placed between two polyethylene sheets and pressed in a mold under 800 p.s.i. to form a thin flat disc having a rectangular cross section. The preform may be molded at from 100 p.s.i. to 2000 p.s.i. if desired.

TOOTH SHAPED DOUGH PREFORM

In order to assist in the removal of excess monomer certain drying operations are performed on the doughnut shaped lingual preform as well as on the intermediate preform.

The doughnut shaped preform is placed into the lingual part of the mold and covered with a polyethylene sheet. The component or forming top part of the mold is put in place and the mold closed under 1700 p.s.i. The mold is opened and the polyethylene sheet removed. One side of the intermediate preform having been exposed by the removal of the polyethylene sheet is placed so that the unexposed side is in contact with the exposed portion of the tooth shaped dough preform. The polyethylene sheet having been removed and placed on the exposed side and again the component or forming top part of the mold is put in place and the mold closed under 1700 p.s.i. Due to the differential drying of the doughnut shaped body preform and the intermediate preform the intermediate dough displaces a portion of the body dough. The intermediate preform, at a thickness of from 0.005 to 0.015 inch allows a non-crosslinked surface to be available for bonding to the labial preform material in the final molding operation.

FIRST STAGE CURING

The component or forming top portion of the mold is removed, the polyethylene liner sheet removed and the component or forming top portion of the mold is replaced. The closed mold now contains the tooth shaped preform which consists of a laminated crosslinked layer to a non-crosslinked layer. The laminated composite is polymerized at a temperature of from 180 to 210° F. and a pressure of 2500 p.s.i. for from 1½ to 5 minutes. The non-crosslinked layer serves as an intermediate layer in the second stage molding operation, below.

The labial surface of this intermediate layer remains non-crosslinked during the first stage curing and provides a surface which can be attacked by the free monomer available in the labial dough preform, thereby giving rise to a chemical bonding of these two surfaces. During the second stage molding operation there is sufficient migration of the crosslinking agent from the labial dough into the non-crosslinked layer to provide sufficient crosslinking so that the entire finished molded tooth is crosslinked. The finished tooth is of superior properties specifically with regard to attack by solvents which, were the material non-crosslinked, would cause objectionable crazing.

SECOND STAGE MOLDING

The mold containing the polymerized laminated preform is removed from the press and is opened without cooling. The component or forming top is removed and the previously mentioned labial dough preform, without being subjected to any drying operation is separated from both of the polyethylene sheets and is put into place against the non-crosslinked surface of the polymerized lingual portion. The mold top is then put into place with the labial dough preform encased between the final top and the polymerized laminated preform. The mold is closed under a pressure of 100 p.s.i. and placed in a press operating at a temperature of from 200 to 300° F. and a pressure of 2500 p.s.i. for 1½ to 5 minutes.

COOLING

Without opening the mold it is transferred to a press operating at a temperature of from 45 to 100° F. under a pressure of 800 p.s.i. for a period of time sufficient to bring the mold temperature to from 80 to 100° F.

Obviously, many modifications and variations of the invention, as hereinbefore set forth, may be made without departing from the spirit and scope thereof, and therefore only such limitations should be imposed as are indicated in the appended claims.

I claim:

1. The method of forming a molded composite article of polymerized methacrylate ester resin comprising shaping a first portion from a dough of mixed finely divided solid methacrylate ester polymer and liquid methacrylate monomer ester with up to 20% of a cross-linking agent selected from the group consisting of allyl methacrylate, ethylene glycol dimethacrylate and polyethylene glycol dimethacrylate, simultaneously contacting one surface of said shaped dough with a heat-resistant non-adherent liner sheet made of synthetic resin selected from the group consisting of linear polyethylene, tetrafluorethylene polymer, polyvinyl alcohol and heat resistant nylon, said liner having a thickness of between about 1 to about 10 mils, polymerizing said first portion by molding said dough faced with said liner at a temperature between about 180° F. to about 210° F. and pressure of about 800 to about 5000 pounds per square inch for 2 to 5 minutes to provide a latent adhesive preform having substantially the same shape as in the molded composite article but also having an incompletely polymerized latent adhesive surface under said liner, removing said liner sheet, assembling against said latent adhesive surface of said first preform portion second preform portion consisting of an unpolymerized mass of finely divided solid methacrylate ester polymer in intimate admixture with liquid methyl methacrylate in dough consistency and molding said first latent adhesive preform and said second unpolymerized mass at a temperature of about 190°–300° F. and pressure of about 1500–5000 pounds per square inch for about 1½ to about 10 minutes to polymerize said second portion while bonding and polymerizing said incompletely polymerized surface of said first preform with the contacting surface of said second portion.

2. The method of forming a molded composite article of polymerized methacrylate ester resin comprising shaping a first portion from a dough of mixed finely divided solid methacrylate ester polymer and liquid methacrylate monomer ester with up to 20% of a polyfunctional polymerizable monomer as cross-linking agent, simultaneously contacting one surface of said shaped dough with a heat-resistance non-adherent liner sheet made of synthetic resin selected from the group consisting of linear polyethylene, tetrafluorethylene polymer, polyvinyl alcohol and heat-resistant nylon, said liner having a thickness of between about 1 to about 10 mils, polymerizing said first portion by molding said dough faced with said liner at a temperature between about 180° F. to about 210 F. and pressure of about 800 to about 5000 pounds per square inch for 2 to 5 minutes to provide a latent adhesive preform having substantially the same shape as in the molded composite article but also having an incompletely polymerized latent adhesive surface under said liner, removing said liner sheet, assembling against said latent adhesive surface of said preform portion surface a second portion consisting of an unpolymerized mass of finely divided solid methacrylate ester polymer in intimate admixture with liquid methyl methacrylate in dough consistency and molding said first latent adhesive preform and said second unpolymerized mass at a temperature of about 190–300° F. and pressure of about 1500–5000 pounds per square inch for about 1½ to about 10 minutes to polymerize said second portion while bonding and polymerizing said incompletely polymerized surface of said first preform with the contacting surface of said second portion.

3. A method of polymerizing shade blended acrylic resin composite teeth utilizing a plural part separable mold one part of which defines the labial surface, another part of which defines the lingual surface and a third part which defines the labial aspect of the desired amount of gingival shade which will appear in the finished tooth of a tooth mold cavity comprising forming and shaping from incompletely cross-linked polymerized methacrylate ester dough material a first gingival body position while contacting one surface of said dough with a heat-resistant non-adherent liner sheet made of synthetic resin selected from the group consisting of linear polyethylene, tetrafluorethylene polymer, polyvinyl alcohol and heat-resistant nylon, said liner having a thickness of between about 1 to about 10 mils, polymerizing said first portion by molding said dough faced with said liner at a temperature between about 180° F. to about 210° F. and pressure of about 800 to about 5000 pounds per square inch for 2 to 5 minutes in a mold to provide a latent adhesive preform having substantially the same shape as in the molded polymerized latent adhesive surface under said liner, removing said liner sheet, assembling against said rigid portion a second preform incisal portion of an unpolymerized dough of finely divided solid methacrylate ester polymer in intimate admixture with liquid methyl methacrylate and molding said latent adhesive preform and said second unpolymerized portion at a temperature of about 190–300° F. and pressure of about 1500–5000 pounds per square inch for about 1½ to 10 minutes to polymerize said second portion while bonding and polymerizing said incompletely polymerized surface of said first preform with the contacting surface of said second portion.

4. A method of simultaneously molding a plurality of shaded composite polymeric acrylic teeth utilizing a separable mold defining in assembly a plurality of individual tooth mold cavities in an arcuate series, one part of the mold defining a labial surface, another part of said mold defining a lingual surface and a third part defining the labial aspect of the desired amount of gingival shade which will appear in the finished tooth comprising shaping a first gingival portion from a dough of finely divided solid methacrylate ester polymer in intimate admixture with liquid methacrylate ester and a cross-linking methacrylate diester while contacting one surface of said dough with a heat-resistant non-adherent liner made of linear polyethylene, said liner film having a thickness of between about 1 to about 10 mils, polymerizing said first portion by molding said dough and liner at a temperature between about 180° F. to about 210° F. and pressure of about 800 to about 5000 pounds per square inch for 2 to 5 minutes to provide a latent adhesive gingival portion having substantially the same shape as in the molded composite article but also having an incompletely polymerized latent adhesive surface under said liner, removing said liner, assembling against said latent adhesive portion a second preformed incisal portion of an unpolymerized dough of finely divided solid methacrylate ester polymer in intimate admixture with liquid methyl methacrylate and a cross-linking methacrylate diester and molding said first latent adhesive portion and said second dough portion at a temperature of about 190–300° F. and pressure of about 1500–5000 pounds per square inch to polymerize said first and second portions and to bond by polymerizing said incompletely polymerized surface of said first portion with the contacting surface of said second portion.

5. The method of producing an artificial tooth using a plural part mold defining a plurality of mold cavities, each of the mold cavities having labial, lingual and incisal tip surfaces which comprises forming from incompletely polymerized methacrylate ester material a gingival tooth portion against the lingual surface of said mold while applying a heat-resistant polymerization inhibiting polyethylene liner against the opposite bonding surface of said gingival tooth portion, said liner being from about 1 to about 10 mils in thickness, polymerizing by molding said gingival portion and liner at a temperature of about 180–210° F. and pressure of about 800 to about 5000 pounds per square inch for 2 to 5 minutes to provide a latent adhesive portion having a potentially adhesive surface beneath said liner, removing said liner, assembling in juxtaposition with the potentially adhesive surface of said latent adhesive gingival tooth portion an incompletely polymerized methacrylate ester material which is preformed as an annulus of rectangular cross-section for the incisal portion and molding said latent adhesive portion and said second dough preform portion at a temperature of 190–300° F. and pressure about 1500–5000 pounds per square inch for 1½ to 10 minutes to bond and cure said incompletely polymerized surface of said latent adhesive portion with the said second preform portion.

6. A process as claimed in claim 1 wherein said first and second portions are bonded at a temperature of 300° F. and a pressure of about 2500 pounds per square inch for about 3 to about 5 minutes.

7. A process as claimed in claim 1 wherein said first portion of dough is dried on one side with the other side faced with said liner for a period of about 3–5 minutes at room temperature.

8. A process as claimed in claim 1 wherein an intermediate layer of unpolymerized methacrylate ester dough is placed in the mold prior to first stage curing, thus presenting a non-cross-linked surface available for joining to the labial preform material in the final molding operation.

9. A process as claimed in claim 2 wherein an intermediate layer of unpolymerized methacrylate ester dough is placed in the mold prior to first stage curing, thus presenting a non-cross-linked surface available for joining to the labial preform material in the final molding operation.

References Cited in the file of this patent

UNITED STATES PATENTS

| | | |
|---|---|---|
| 2,491,097 | Feagin | Dec. 13, 1949 |
| 2,678,470 | Slack | May 18, 1954 |
| 2,874,467 | Becker et al. | Feb. 24, 1959 |